United States Patent
Farrell et al.

(10) Patent No.: US 9,973,608 B2
(45) Date of Patent: *May 15, 2018

(54) FLEXIBLE TELEMATICS SYSTEM AND METHOD FOR PROVIDING TELEMATICS TO A VEHICLE

(71) Applicant: Sirius XM Connected Vehicle Services Inc., Irving, TX (US)

(72) Inventors: Tod Farrell, Coppell, TX (US); Robert Orson Ellingson, Grapevine, TX (US)

(73) Assignee: Sirius XM Connected Vehicle Services Inc., Irving, TX (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/450,558

(22) Filed: Mar. 6, 2017

(65) Prior Publication Data
US 2017/0180529 A1   Jun. 22, 2017

Related U.S. Application Data

(63) Continuation of application No. 14/842,260, filed on Sep. 1, 2015, now Pat. No. 9,628,599, which is a
(Continued)

(51) Int. Cl.
*H04W 4/00* (2018.01)
*H04M 1/60* (2006.01)
*H04W 76/02* (2009.01)

(52) U.S. Cl.
CPC ......... *H04M 1/6091* (2013.01); *H04W 76/02* (2013.01); *H04M 2250/02* (2013.01); *H04M 2250/10* (2013.01)

(58) Field of Classification Search
CPC ........... H04M 1/6091; H04M 2250/10; H04M 2250/02; H04W 76/02
(Continued)

(56) References Cited

U.S. PATENT DOCUMENTS 6,076,028 A   6/2000 Donnelly et al.
6,330,499 B1  12/2001 Chou et al.
(Continued)

FOREIGN PATENT DOCUMENTS

CN   101071564 A   11/2007
DE   19638071      9/1996
(Continued)

OTHER PUBLICATIONS

European Search Report for the application No. EP 10756745 dated Feb. 29, 2016.
(Continued)

*Primary Examiner* — Amancio Gonzalez
(74) *Attorney, Agent, or Firm* — Mayback & Hoffman, P.A.; Gregory L. Mayback

(57) ABSTRACT

A method for providing telematics to a vehicle comprises providing a telematics unit with a Global Positioning System device, a data pump, and a short range wireless personal area network transceiver, communicatively connecting the telematics unit to an integrated communication device of the vehicle, the integrated communication device having a memory holding a list uniquely identifying at least one mobile communication device selected from a currently paired mobile communication device, a previously paired mobile communication device, and a pre-defined mobile communication device, transmitting an alert out from the telematics unit to an off-site telematics provider utilizing a communications path of the data pump, and receiving a channeled response to the alert from the off-site telematics provider automatically through the at least one mobile communication device.

18 Claims, 4 Drawing Sheets

Related U.S. Application Data continuation of application No. 14/274,019, filed on May 9, 2014, now Pat. No. 9,401,978, which is a continuation of application No. 13/033,046, filed on Feb. 23, 2011, now Pat. No. 8,774,794, which is a continuation of application No. 12/363,267, filed on Jan. 30, 2009, now Pat. No. 8,626,152, said application No. 14/274,019 is a continuation of application No. 13/033,083, filed on Feb. 23, 2011, now Pat. No. 8,761,758, which is a continuation of application No. 12/363,267, filed on Jan. 30, 2009, now Pat. No. 8,626,152, said application No. 14/274,019 is a continuation of application No. 13/033,112, filed on Feb. 23, 2011, now Pat. No. 8,798,616, which is a continuation of application No. 12/363,267, filed on Jan. 30, 2009, now Pat. No. 8,626,152, said application No. 14/274,019 is a continuation of application No. 13/033,167, filed on Feb. 23, 2011, now Pat. No. 8,818,358, which is a continuation of application No. 12/363,267, filed on Jan. 30, 2009, now Pat. No. 8,626,152, said application No. 14/274,019 is a continuation of application No. 13/033,185, filed on Feb. 23, 2011, now Pat. No. 8,768,345, which is a continuation of application No. 12/363,267, filed on Jan. 30, 2009, now Pat. No. 8,626,152.

(60) Provisional application No. 61/024,956, filed on Jan. 31, 2008.

(58) Field of Classification Search
USPC .............. 455/41.2, 41.3, 426.1; 707/104.1, 707/999.107; 340/904
See application file for complete search history.

(56) References Cited

U.S. PATENT DOCUMENTS

| | | |
|---|---|---|
| 6,339,746 B1 | 1/2002 | Sugiyama et al. |
| 6,351,698 B1 | 2/2002 | Kubota et al. |
| 6,381,535 B1 | 4/2002 | Durocher et al. |
| 6,405,123 B1 | 6/2002 | Rennard et al. |
| 6,560,581 B1 | 5/2003 | Fox et al. |
| 6,789,061 B1 | 9/2004 | Fischer et al. |
| 6,789,065 B2 | 9/2004 | Berner et al. |
| 6,834,265 B2 | 12/2004 | Balasuriya |
| 6,868,385 B1 | 3/2005 | Gerson |
| 6,968,311 B2 | 11/2005 | Knockeart et al. |
| 6,970,703 B2 | 11/2005 | Fuchs et al. |
| 6,999,874 B2 | 2/2006 | Seto et al. |
| 7,039,050 B1 | 5/2006 | Mutreja |
| 7,164,922 B2 | 1/2007 | McCann |
| 7,171,242 B2 | 1/2007 | Kobayashi |
| 7,203,651 B2 | 4/2007 | Baruch et al. |
| 7,363,228 B2 | 4/2008 | Wyss et al. |
| 7,373,248 B2 | 5/2008 | Schalk |
| 7,634,357 B2 | 12/2009 | Schalk |
| 7,657,433 B1 | 2/2010 | Chang |
| 7,778,774 B2 | 8/2010 | Li |
| 7,920,944 B2 | 4/2011 | Gould |
| 8,044,809 B2 | 10/2011 | Farmer |
| 8,386,125 B2 | 2/2013 | Ross |
| 8,478,520 B2 | 7/2013 | Schalk |
| 8,543,401 B2 | 9/2013 | Suendermann et al. |
| 8,626,152 B2 | 1/2014 | Farrell et al. |
| 8,694,244 B2 | 4/2014 | Schalk |
| 8,706,405 B2 | 4/2014 | Schalk |
| 8,738,287 B2 | 5/2014 | Schalk |
| 8,774,794 B2 * | 7/2014 | Farrell .................. G08G 1/205 340/904 |
| 8,825,379 B2 | 9/2014 | Schalk |
| 9,338,605 B2 | 5/2016 | Guba et al. |
| 2002/0046023 A1 | 4/2002 | Fujii et al. |
| 2002/0084891 A1 | 7/2002 | Mankins et al. |
| 2002/0098853 A1 | 7/2002 | Chrumka |
| 2002/0156570 A1 | 10/2002 | Ohtsuji et al. |
| 2002/0194000 A1 | 12/2002 | Bennett et al. |
| 2003/0083079 A1 | 5/2003 | Clark et al. |
| 2003/0088359 A1 | 5/2003 | Park |
| 2003/0120486 A1 | 6/2003 | Brittan et al. |
| 2003/0229444 A1 | 12/2003 | Bullock et al. |
| 2004/0036622 A1 | 2/2004 | Dukach et al. |
| 2004/0128135 A1 | 7/2004 | Anastasakos et al. |
| 2004/0142678 A1 | 7/2004 | Krasner |
| 2004/0176906 A1 | 9/2004 | Matsubara et al. |
| 2004/0203634 A1 | 10/2004 | Wang |
| 2004/0204806 A1 | 10/2004 | Chen et al. |
| 2004/0205386 A1 | 10/2004 | Staiger |
| 2004/0243414 A1 | 12/2004 | Yamada et al. |
| 2005/0040944 A1 | 2/2005 | Contestabile |
| 2005/0049785 A1 | 3/2005 | Vergin |
| 2005/0096980 A1 | 5/2005 | Koningstein |
| 2005/0130723 A1 | 6/2005 | Grivas et al. |
| 2005/0137877 A1 | 6/2005 | Oesterling et al. |
| 2005/0187677 A1 | 8/2005 | Walker |
| 2005/0222933 A1 | 10/2005 | Wesby |
| 2005/0240404 A1 | 10/2005 | Gurram et al. |
| 2006/0012597 A1 | 1/2006 | Chakraborty |
| 2006/0025173 A1 | 2/2006 | Kamdar et al. |
| 2006/0046649 A1 | 3/2006 | Videtich |
| 2006/0079251 A1 | 4/2006 | Obradovich et al. |
| 2006/0097855 A1 | 5/2006 | Turnbull et al. |
| 2006/0123053 A1 | 6/2006 | Scannell, Jr. |
| 2006/0129406 A1 | 6/2006 | Mandalia et al. |
| 2006/0238320 A1 | 10/2006 | Veliu et al. |
| 2006/0276201 A1 | 12/2006 | Dupray |
| 2006/0293813 A1 | 12/2006 | Nou |
| 2007/0011278 A1 | 1/2007 | Nou |
| 2007/0016362 A1 | 1/2007 | Nelson |
| 2007/0038510 A1 | 2/2007 | Laghrari et al. |
| 2007/0086579 A1 | 4/2007 | Lorello et al. |
| 2007/0093200 A1 | 4/2007 | Dobosz |
| 2007/0136069 A1 | 6/2007 | Veliu et al. |
| 2007/0150191 A1 | 6/2007 | Li et al. |
| 2007/0219807 A1 | 9/2007 | Schalk et al. |
| 2007/0265849 A1 | 11/2007 | Gross et al. |
| 2008/0004788 A1 | 1/2008 | Dorfstatter et al. |
| 2008/0077310 A1 | 3/2008 | Murlidar et al. |
| 2008/0118051 A1 | 5/2008 | Odinak et al. |
| 2008/0147410 A1 | 6/2008 | Odinak |
| 2008/0154870 A1 | 6/2008 | Evermann et al. |
| 2008/0177551 A1 | 7/2008 | Schalk |
| 2008/0212215 A1 | 9/2008 | Schofield et al. |
| 2008/0248815 A1 | 10/2008 | Busch |
| 2009/0030684 A1 | 1/2009 | Cerra et al. |
| 2009/0204407 A1 | 8/2009 | Shields |
| 2009/0204409 A1 | 8/2009 | Mozer et al. |
| 2009/0204410 A1 | 8/2009 | Mozer et al. |
| 2009/0299745 A1 | 12/2009 | Kennewick |
| 2010/0010740 A1 | 1/2010 | Nachman et al. |
| 2010/0049516 A1 | 2/2010 | Talwar et al. |
| 2010/0063668 A1 | 3/2010 | Zhang et al. |
| 2010/0305809 A1 | 12/2010 | Audisio et al. |
| 2010/0312547 A1 | 12/2010 | Van Os et al. |
| 2011/0015928 A1 | 1/2011 | Odell et al. |
| 2011/0159868 A1 | 6/2011 | Granda et al. |
| 2011/0270468 A1 | 11/2011 | Kristinsson et al. |
| 2011/0271270 A1 | 11/2011 | Bowen |
| 2012/0041638 A1 | 2/2012 | Johnson et al. |
| 2012/0190386 A1 | 7/2012 | Anderson |
| 2013/0124038 A1 | 5/2013 | Naboulsi |
| 2013/0179198 A1 | 7/2013 | Bowne et al. |
| 2014/0046701 A1 | 2/2014 | Steinberg et al. |
| 2014/0122569 A1 | 5/2014 | Abel et al. |
| 2014/0171133 A1 | 6/2014 | Stuttle et al. |
| 2014/0287723 A1 | 9/2014 | Lafever et al. |

FOREIGN PATENT DOCUMENTS

| | | |
|---|---|---|
| EP | 1341363 B1 | 11/2002 |
| EP | 1589525 A1 | 10/2005 |
| EP | 928529 | 6/2008 |

(56) References Cited

FOREIGN PATENT DOCUMENTS

| FR | 2827695 | | 1/2003 |
|----|---------|---|--------|
| WO | 9812851 | | 3/1998 |
| WO | 0248650 | A1 | 6/2002 |
| WO | 03079310 | A2 | 9/2003 |
| WO | 2005024781 | A1 | 3/2005 |

OTHER PUBLICATIONS

European Search Report of EP App. No. 09807401.6 dated Jul. 6, 2012.
International Search Report from PCT/US10/28380 dated May 5, 2010.
International Search Report of PCT/US09/53958 dated Sep. 21, 2009.
International Search Report of PCT/US12/42941 dated Sep. 14, 2012.
Office Action dated Mar. 21, 2016 for (CA Patent Application No. 2756140).
Office Action of Russian Patent App. No. 2011108941 dated Dec. 26, 2013.
Second Office Action of the State Intellectual Property Office of the People's Republic of China for App. No. 201080023617.5 dated Jul. 29, 2013.
Huang, et al.,Spoken Language Processing, A Guide to Theory, Algorithm, and System Development, Prentice-Hall, Inc. (2001) ,pp. vii-15.
Digg—"Blue & Me" Microsoft's New OS for your Car; http://digg.com/software/Blue_Me_Microsoft's_New_OS_for_you_Car, dated Jan. 14, 2008, pp. 1-2.
Extended European Search Report for European Patent App. No. 09 70 6197 dated Dec. 23, 2014.
Fiat and Microsoft Launch Blue&Me; http://www.businessweek.com/autos/content/feb2006/bw20060202_986426.htm, dated Feb. 2, 2006, pp. 1-2.
International Search Report of International Patent Application No. PCT/US09/32761 dated Mar. 10, 2009.
Microsoft, Fiat, and a tech named Blue/Crave: The gadget blog; http://crave.cnet.com/8301-1 105-9694303-1.html dated Mar. 6, 2007, pp. 1-2.
Software Development: Blue & Me—Fiat and Microsoft Collaboration; http://blogs.msdn.com/emre/archieve/2007/07/08/blue-me-fiat-and-microsoft-collaboration, dated Jul. 8, 2007, pp. 1-2.
Sync: Voice-activated mobile phone and digital music system for your car; http://www.syncmyride.com; dated Jan. 6, 2008, pp. 1-2.
Up Close: Microsoft's Sync Car OS—Columns by PC Magazine; http://www.pcmag.com/article 2/0, 1759,2080527,00. asp dated Jan. 8, 2007, pp. 1-2.

* cited by examiner

FLEXIBLE TELEMATICS SYSTEM AND METHOD FOR PROVIDING TELEMATICS TO A VEHICLE

CROSS-REFERENCE TO RELATED APPLICATIONS

The present application:
is a continuation of U.S. patent application Ser. No. 14/842,260, filed Sep. 1, 2015, which:
  is a continuation of U.S. patent application Ser. No. 14/274,019, filed on May 9, 2014, now U.S. Pat. No. 9,401,978, issued on Jul. 26, 2016, which:
    is a continuation of U.S. patent application Ser. No. 13/033,046, filed on Feb. 23, 2011, now U.S. Pat. No. 8,774,794, issued on Jul. 8, 2014, which:
      is a continuation of U.S. patent application Ser. No. 12/363,267, filed on Jan. 30, 2009, now U.S. Pat. No. 8,626,152, issued on Jan. 7, 2014, which claims the priority, under 35 U.S.C. § 119, of U.S. Provisional Patent Application No. 61/024,956, filed on Jan. 31, 2008;
    is a continuation of U.S. patent application Ser. No. 13/033,083, filed on Feb. 23, 2011, now U.S. Pat. No. 8,761,758, issued on Jun. 24, 2014, which:
      is a continuation of U.S. patent application Ser. No. 12/363,267, filed on Jan. 30, 2009, now U.S. Pat. No. 8,626,152, issued on Jan. 7, 2014, which claims the priority, under 35 U.S.C. § 119, of U.S. Provisional Patent Application No. 61/024,956, filed on Jan. 31, 2008;
    is a continuation of U.S. patent application Ser. No. 13/033,112, filed on Feb. 23, 2011, now U.S. Pat. No. 8,798,616, issued on Aug. 5, 2014, which:
      is a continuation of U.S. patent application Ser. No. 12/363,267, filed on Jan. 30, 2009, now U.S. Pat. No. 8,626,152, issued on Jan. 7, 2014, which claims the priority, under 35 U.S.C. § 119, of U.S. Provisional Patent Application No. 61/024,956, filed on Jan. 31, 2008;
    is a continuation of U.S. patent application Ser. No. 13/033,167, filed on Feb. 23, 2011, now U.S. Pat. No. 8,818,358, issued on Aug. 26, 2014, which:
      is a continuation of U.S. patent application Ser. No. 12/363,267, filed on Jan. 30, 2009, now U.S. Pat. No. 8,626,152, issued on Jan. 7, 2014, which claims the priority, under 35 U.S.C. § 119, of U.S. Provisional Patent Application No. 61/024,956, filed on Jan. 31, 2008; and
    is a continuation of U.S. patent application Ser. No. 13/033,185, filed on Feb. 23, 2011, now U.S. Pat. No. 8,768,345, issued on Jul. 1, 2014, which
      is a continuation of U.S. patent application Ser. No. 12/363,267, filed on Jan. 30, 2009, now U.S. Pat. No. 8,626,152, issued on Jan. 7, 2014, which claims the priority, under 35 U.S.C. § 119, of U.S. Provisional Patent Application No. 61/024,956, filed on Jan. 31, 2008,
the entire disclosures of which are hereby incorporated herein by reference in their entireties.

STATEMENT REGARDING FEDERALLY SPONSORED RESEARCH OR DEVELOPMENT

Not Applicable

FIELD OF THE INVENTION

The present systems and methods lie in the field of providing a telematics system in a vehicle that has not previously been set up for such a system. More specifically, the present disclosure relates to a simplified telematics system for use in a new vehicle at a manufacturing site, or as a retrofitted telematics system to an existing vehicle, and methods for providing such telematics to a vehicle.

BACKGROUND OF THE INVENTION

As consumer vehicles, such as cars and trucks, become more technologically complicated, operation of that vehicle becomes even more difficult. Today there is such an array of devices in trucks and cars that driver distraction is a major problem. To ease the driver's burden, mobile telematics systems and services have evolved that integrate wireless communications and (usually) location determining devices into vehicles to perform a number of tasks including, for example, carrying out remote engine diagnostics, locating stolen vehicles, and providing roadside assistance. Integration of such telematics systems requires significant design and implementation costs, not to mention the costly hardware that needs to be installed in the vehicle. Even though some manufacturers have started to include telematics systems with new vehicles, most new vehicles on the road today do not have such systems. More importantly, most manufacturers do not design vehicles to house such complex technology. When the manufacturers do incorporate this technology, it requires extra wiring and complexity. Thus, a need exists to make simpler systems both for installation at the site of manufacturing and retrofitting into existing vehicles without having to modify the vehicle in any substantial way (whether in terms of cost or labor).

While most vehicles do not have telematics systems pre-installed, many vehicles do have other kinds of integrated electronic communication devices. One kind of communications device that can be found in some vehicles is a Bluetooth transceiver. Bluetooth is an industrial specification for wireless personal area networks (PANs). A Bluetooth gateway provides measures for connection and exchanging information between devices such as mobile phones, laptops, PCs, printers, digital cameras, and video game consoles over a secure, globally unlicensed short-range radio frequency. Equipping vehicles with a Bluetooth transceiver (also referred to as a Bluetooth gateway) makes it possible to link the vehicle with other Bluetooth-compatible devices brought into or near the car, the most common of which is a Bluetooth-compatible cell phone.

When a Bluetooth-compatible cell phone is brought into a vehicle equipped with a Bluetooth transceiver, a data link is created between the phone and the transceiver. The most common feature made available to owners of vehicles so equipped is the ability to talk on the cell phone in a hands-free manner. In this embodiment, the vehicle is provided with a microphone (at least one near or directed at the head of the driver) for receiving audio from at least the driver (and, possibly, any passenger within the vehicle). A speaker system commonly associated with a vehicle's radio is temporarily connected to the transceiver and is, thereby, used to present any received audio signals to the user. Of course, dedicated speakers can be provided in the vehicle for this function or even a combination of these exemplary configurations. With such a configuration, bi-directional audio communication is made available to occupants of the vehicle.

Another common Bluetooth feature is the ability to display and/or use the phone list stored in the cell phone for making calls without having to touch the cell phone. Either the vehicle is provided with a voice-recognition system to select a particular number in the cell phone's phone number list or has mechanical controls for doing so, or both. Such systems, however, do not have the ability to expand beyond these limited functions.

There exists a need to be able to provide a simplified, cost-effective telematics system to be used both by original equipment manufacturers for new vehicle installations and by owners of existing vehicles for retrofitting into vehicles only having a Bluetooth transceiver without having to modify the vehicle in any substantial way (whether in terms of cost or labor). Even with the advent of telematics systems in vehicles today, there is not currently a service that is deployed to solve the above-described problems. It would be a significant advancement in the art to provide a telematics system in a vehicle where one did not exist before and where the vehicle was not pre-configured to provide such features.

Thus, a need exists to overcome the problems with the prior art systems, designs, and processes as discussed above.

SUMMARY OF THE INVENTION

Disclosed is a device and method for simplifying manufacturer-fitted telematics systems and retrofitting a telematics communication and control unit in a vehicle configured with a Bluetooth transceiver. This system and its process makes use of existing, in-vehicle Bluetooth gateways (in one embodiment, referred to as a "Sync Box") by adding a component that contains all needed additional hardware for carrying out the desired telematics functions, for example, a positioning module (e.g., GPS) and a data module. The data module can be a phone with voice capability, but it can also be merely a data modem. Software is also added. Each vehicle equipped with Bluetooth communications capabilities has a Bluetooth gateway with particular characteristics, which can be obtained from the vehicle's manufacturer. A vehicle-specific software application is added to the Bluetooth gateway. In this way, the inventive telematics component (also referred to as a telematics gateway) can be linked to user interfaces of the vehicle through the Bluetooth gateway. This link is achieved through the standard Bluetooth PAN. This software application contains appropriate logic for activation of the telematics component.

While it is known to use vehicle interfaces to receive and transmit audio phone calls through a vehicle's Bluetooth gateway, this gateway has not been used with data-oriented telematics functions. Where, for example, the phone does not have service available for communicating audio phone calls, the present disclosure still allows telematics functionality in a vehicle through use of the inventive data-oriented communication system. Moreover, the present disclosure provides this functionality as a retro-fitting system. Thus, the present disclosure permits, for the first time, telematics functionality in a vehicle without requiring the vehicle manufacturer to pre-design and pre-install such functionality.

In prior-art vehicle telematics components, a dedicated bi-directional voice communications link was required. This link was provided by including an integrated device containing the same functionality as a standard cellular phone. Concomitantly, charges for this link were incurred and were at a level comparable to a consumer's pre-existing portable cell phone. Such systems, therefore, caused the consumer to pay approximately double fees for these two cellular devices.

In contrast, the present disclosure entirely eliminates the need for a bi-directional, voice-supporting cellular device to be included in the telematics component. Instead, the telematics component of the present disclosure needs only to have a data transceiver, also referred to as a data pump. The telematics component can carry out all external data communication through this data pump. More specifically, when a user enters a vehicle with a Bluetooth-compatible device, the Bluetooth system sets up a communications link between the system and the device. This device can be already recognized (where it has been coupled with this system in the past) or it can be new to the system (in which case, a recognition protocol between the system and the device is carried out). The Bluetooth system stores information about each such device in a client stack, in which each such device is uniquely identified and recorded. The Bluetooth system is, then, able to direct data to, from, and through each such device in parallel or by multiplexing. The telematics component of the present disclosure utilizes this information and connection to communicate outside the vehicle for voice. For example, if a request for information is transmitted out from the telematics component, the path for such a communication will be between the data pump and the Bluetooth system, which data pump is capable of sending out the query data and receiving back the answer data. By knowing which devices are paired, the telematics component can embed the unique calling identifier (e.g., the cellular phone number) within the transmitted data. Then, when the off-site telematics information provider responds to the query, the response is channeled automatically through the paired device. The transaction can be entirely non-voice, in which the user is entirely unaware that their data pump was used for this telematics request, or can include (partially or wholly) voice data. In the latter case, the user's phone will ring, just as receiving a phone call, and the voice response from the telematics operator (whether automated, recorded or live) is conveyed to the vehicle user. In an alternative exemplary embodiment, the telematics component does not embed the unique calling identifier and calls a particular pre-programmed cell phone that is set by the system or the user to receive a call when a given event occurs.

If there is a reason to originate data from a telematics operator to the vehicle or an occupant of the vehicle, the data is sent through the data pump. Then, when a mobile terminated communication occurs (i.e., to the vehicle), each of these paired devices is polled to determine if they are currently paired with the telematics component. When such a query returns a positive result, the data can be communicated (e.g., displayed) to the current user through one of the currently paired devices.

Thus, the present disclosure entirely eliminates the need for a voice-capable cellular device to be included with the telematics component. By utilizing the vehicle's Bluetooth gateway, the present disclosure can take hold, temporarily, of the consumer's portable cell phone to carry out the needed telematics voice communication, resulting in a significant cost savings.

The disclosure provides a simplified manufacturer's install or retrofitting telematics system and method for providing telematics to a vehicle that overcome the hereinafore-mentioned disadvantages of the heretofore-known devices and methods of this general type and that provides a telematics system in a vehicle that has not previously been set up for such a system.

With the foregoing and other objects in view, there is provided, a method for providing information to a user of a telematics system, the telematics system comprising a telematics unit, a mobile device of the user, and an integrated communication device of a vehicle, includes the steps of receiving an event call at the telematics unit and, in response to the event call, sending a first message from the telematics unit to at least one of the mobile device of the user and the integrated communication device of the vehicle and sending a second message from the telematics unit to a telematics provider over a communications channel, the second message causing the telematics provider to communicate with at least one of the mobile device of the user and a mobile device of a third party.

With the objects in view, there is also provided a method for providing information to a user of a telematics system, the telematics system comprising a telematics unit, a mobile device of the user, and an integrated communication device of a vehicle, includes the steps of receiving an event call at the telematics unit and, in response to the event call, sending a first message from the telematics unit to the mobile device of the user and sending a second message from the telematics unit to a telematics provider over a communications channel, the second message causing the telematics provider to communicate with at least one of the mobile device of the user and a mobile device of a third party.

With the objects in view, there is also provided a method for providing information to a user of a telematics system, the telematics system comprising a telematics unit, a mobile device of the user, and an integrated communication device of a vehicle, includes the steps of receiving an event call at the telematics unit and, in response to the event call, sending a first message from the telematics unit to the integrated communication device of the vehicle and sending a second message from the telematics unit to a telematics provider over a communications channel, the second message causing the telematics provider to communicate with at least one of the mobile device of the user and a mobile device of a third party.

In accordance with another mode, the first message sending step is carried out by sending the first message to the mobile device of the user and to the integrated communication device of the vehicle.

In accordance with a further mode, the first message sending step is carried out by sending the first message to a mobile device of a third party.

In accordance with an added mode, the first message comprises status information, the first message comprises diagnostic information, and/or the first message comprises notification information.

In accordance with an additional mode, the step of causing the telematics provider to communicate with the mobile device of the user comprises the mobile device receiving a text message from the telematics provider.

In accordance with yet another mode, the step of causing the telematics provider to communicate with the mobile device of the user comprises the mobile device receiving a data message from the telematics provider.

In accordance with yet a further mode, the step of causing the telematics provider to communicate with the mobile device of the user comprises the mobile device receiving a live voice call from the telematics provider.

In accordance with yet an added mode, the step of causing the telematics provider to communicate with the mobile device of the user comprises the mobile device receiving an automated or pre-recorded voice call from the telematics provider.

In accordance with yet an additional mode, the second message includes global positioning system information.

In accordance with again another mode, the method further comprises sending the second message to the telematics provider to assist the telematics provider in providing telematics function information.

In accordance with again a further mode, the step of causing the telematics provider to communicate with the mobile device of the user comprises the mobile device receiving telematics information from the telematics provider.

In accordance with again an added mode, the step of causing the telematics provider to communicate with the mobile device of the third party comprises the mobile device of the third party receiving telematics information from the telematics provider.

In accordance with again an additional mode,

In accordance with still another mode, the telematics function information comprises at least one of speed alerts, real-time remote vehicle location requests, geo-fencing, stolen vehicle recovery procedures, traffic information, weather information, parking information, navigation, point-of-interest information, vehicle diagnostic information, and trip-planning features.

In accordance with still a further mode, the step of causing the telematics provider to communicate with the mobile device of the third party comprises the mobile device of the third party receiving a text message from the telematics provider.

In accordance with another mode, the step of causing the telematics provider to communicate with the mobile device of the third party comprises the mobile device of the third party receiving a call from the telematics provider.

With the foregoing and other objects in view, there is provided, a method for providing telematics to a vehicle comprises the steps of providing a telematics unit with a Global Positioning System (GPS) device, a data pump, and a short range wireless personal area network transceiver, communicatively connecting the telematics unit to an integrated communication device of the vehicle, the integrated communication device having a memory holding a list uniquely identifying at least one mobile communication device selected from a currently paired mobile communication device, a previously paired mobile communication device, and a pre-defined mobile communication device, transmitting an alert out from the telematics unit to an off-site telematics provider utilizing a communications path of the data pump, and receiving a channeled response to the alert from the off-site telematics provider automatically through the at least one mobile communication device.

With the objects in view, there is also provided a method for providing telematics to a vehicle comprises the steps of providing a telematics unit with a Global Positioning System (GPS) device, a data pump, and a short range wireless personal area network transceiver, communicatively connecting the telematics unit to an integrated communication device of the vehicle, the integrated communication device having a memory holding a list uniquely identifying at least one mobile communication device selected from a currently paired mobile communication device, a previously paired mobile communication device, and a pre-defined mobile communication device, transmitting an alert out from the telematics unit to an off-site telematics provider utilizing a communications path of the integrated communication device, and receiving a channeled response to the alert from the off-site telematics provider automatically through the at least one mobile communication device.

With the objects in view, there is also provided a method for providing telematics to a vehicle comprises the steps of providing a telematics unit with a Global Positioning System (GPS) device, a data pump, and a short range wireless personal area network transceiver, communicatively connecting the telematics unit to an integrated communication device of the vehicle, the integrated communication device having a memory holding a list uniquely identifying at least one mobile communication device selected from a currently paired mobile communication device, a previously paired mobile communication device, and a pre-defined mobile communication device, transmitting an alert out from the telematics unit to an off-site telematics provider utilizing a communications path between the transceiver, the integrated communication device, and the at least one mobile communication device, and receiving a channeled response to the alert from the off-site telematics provider automatically through the at least one mobile communication device.

In accordance with another mode, the communications path of the data pump is a communications path from the data pump to the integrated communication device of the vehicle and from the integrated communication device of the vehicle through the at least one mobile communication device.

In accordance with a further mode, the communications path of the data pump is a communications path from the data pump, through the transceiver, and through the at least one mobile communication device.

In accordance with an added mode, the integrated communication device of the vehicle further comprises a short range wireless personal area network transceiver and wherein the communications path of the data pump is a communications path from the data pump through the transceiver of the telematics unit, through the transceiver of the vehicle, and through the at least one mobile communication device.

In accordance with an additional mode, the transmitting step is carried out by transmitting the alert out from the telematics unit utilizing a direct communications path between the data pump and the off-site telematics provider excluding the integrated communication device.

In accordance with yet another mode, the channeling step is carried out by channeling a response to the alert from the off-site telematics provider automatically through the at least one mobile communication device utilizing a direct communications path between the off-site telematics provider and the at least one mobile communication device excluding the telematics unit.

In accordance with yet a further mode, the integrated communication device of the vehicle includes a short range wireless personal area network transceiver and the communicative connecting step is carried out by communicatively connecting the transceiver of the telematics unit to the transceiver of the integrated communication device of the vehicle.

In accordance with yet an added mode, the transmitting step is carried out by transmitting the alert out from the telematics unit utilizing a communications path of the integrated communication device through the at least one mobile communication device.

In accordance with yet an additional mode, the transmitting step is carried out by transmitting the alert out from the telematics unit utilizing a communications path between the integrated communication device and the data pump.

In accordance with again another mode, the integrated communication device of the vehicle includes a short range wireless personal area network transceiver and the communicative connecting step is carried out by communicatively connecting the transceiver of the telematics unit to the transceiver of the integrated communication device of the vehicle.

In accordance with again a further mode, the communications path of the integrated communication device is a communications path from the data pump to the integrated communication device of the vehicle and from the integrated communication device of the vehicle through the at least one mobile communication device.

In accordance with again an added mode, the integrated communication device of the vehicle further comprises a short range wireless personal area network transceiver and wherein the communications path of the integrated communication device is a communications path from the data pump of the telematics unit, through the transceiver of the telematics unit, through the transceiver of the integrated communication device, and through the at least one mobile communication device.

In accordance with a concomitant mode, the short range wireless personal area network transceiver is a Bluetooth transceiver.

Although the systems and methods are illustrated and described herein as embodied in a simplified manufacturer's install or retrofitting telematics system and method for providing telematics to a vehicle, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems and methods.

Additional advantages and other features characteristic of the systems and methods will be set forth in the detailed description that follows and may be apparent from the detailed description or may be learned by practice of exemplary embodiments. Still other advantages of the systems and methods may be realized by any of the instrumentalities, methods, or combinations particularly pointed out in the claims.

Other features that are considered as characteristic for the systems and methods are set forth in the appended claims. As required, detailed embodiments of the systems and methods are disclosed herein; however, it is to be understood that the disclosed embodiments are merely exemplary of the systems and methods, which can be embodied in various forms. Therefore, specific structural and functional details disclosed herein are not to be interpreted as limiting, but merely as a basis for the claims and as a representative basis for teaching one of ordinary skill in the art to variously employ the systems and methods in virtually any appropriately detailed structure. Further, the terms and phrases used herein are not intended to be limiting; but rather, to provide an understandable description of the systems and methods. While the specification concludes with claims defining the systems and methods of the invention that are regarded as novel, it is believed that the systems and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems and methods. Advantages of embodiments of the systems and methods will be apparent from the following detailed description of the exemplary embodiments thereof, which description should be considered in conjunction with the accompanying drawings in which.

DETAILED DESCRIPTION OF THE INVENTION

Figure 1:
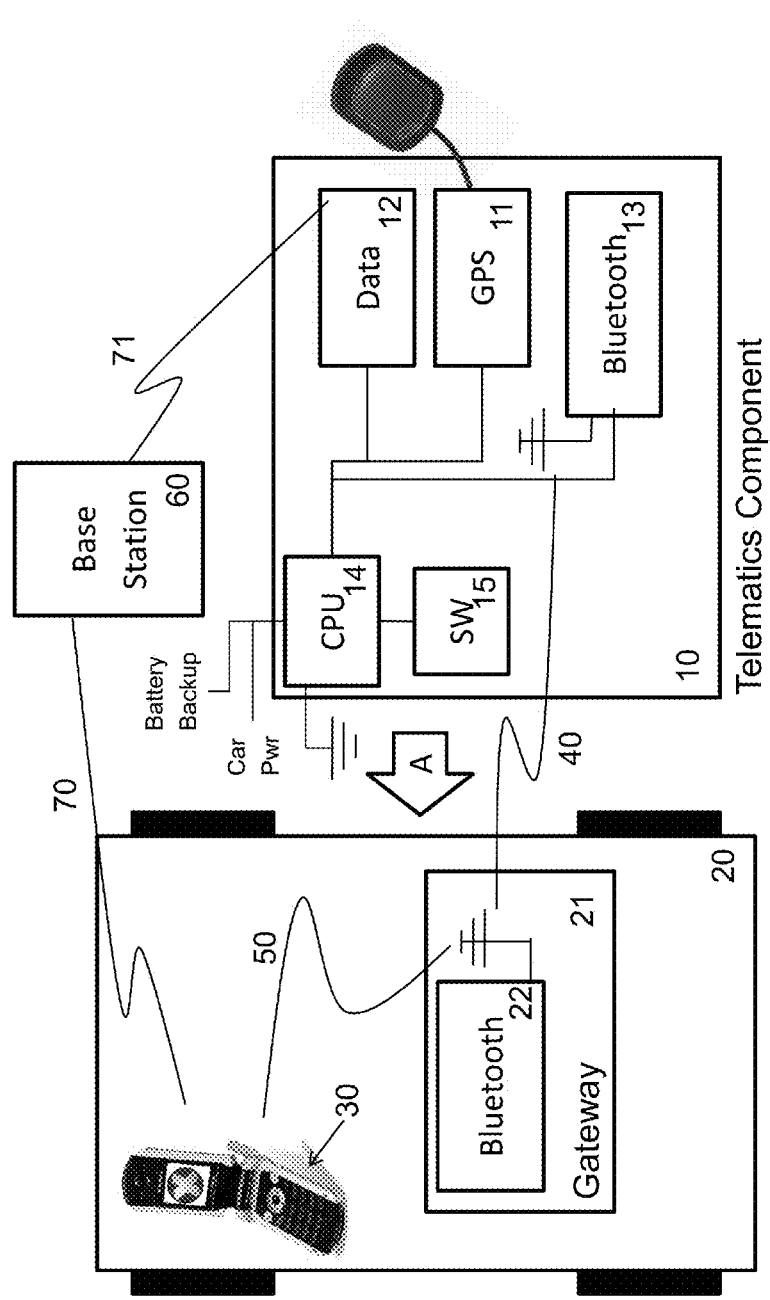
FIG. 1 is a diagrammatic illustration of an exemplary telematics component and base station associated with a prior art vehicle and a cell phone in that vehicle.

As required, detailed embodiments of the systems and methods are disclosed herein; however, it is to be understood that the disclosed embodiments are merely exemplary of the systems and methods, which can be embodied in various forms. Therefore, specific structural and functional details disclosed herein are not to be interpreted as limiting, but merely as a basis for the claims and as a representative basis for teaching one skilled in the art to variously employ the systems and methods in virtually any appropriately detailed structure. Further, the terms and phrases used herein are not intended to be limiting; but rather, to provide an understandable description of the systems and methods. While the specification concludes with claims defining the features of the systems and methods that are regarded as novel, it is believed that the systems and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems and methods will not be described in detail or will be omitted so as not to obscure the relevant details of the systems and methods.

Before the systems and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, and top/bottom. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

It will be appreciated that embodiments of the systems and methods described herein may be comprised of one or more conventional processors and unique stored program instructions that control the one or more processors to implement, in conjunction with certain non-processor circuits and other elements, some, most, or all of the functions of the powered injector devices described herein. The non-processor circuits may include, but are not limited to, signal drivers, clock circuits, power source circuits, and user input and output elements. Alternatively, some or all functions could be implemented by a state machine that has no stored program instructions, or in one or more application specific integrated circuits (ASICs) or field-programmable gate arrays (FPGA), in which each function or some combinations of certain of the functions are implemented as custom logic. Of course, a combination of these approaches could also be used. Thus, methods and means for these functions have been described herein.

The terms "program," "software," "software application," and the like as used herein, are defined as a sequence of instructions designed for execution on a computer system. A "program," "software," "application," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

Herein various embodiments of the systems and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments. Referring now to the figures of the drawings in detail and first, particularly to FIG. 1, there is shown a first exemplary embodiment of a diagrammatic illustration of an exemplary telematics component 10. In this embodiment, the telematics component 10 includes a Global Positioning System (GPS) device 11, a data pump 12, and a Bluetooth transceiver 13. Each of these sub-systems is connected to a central controller 14, which can be a central processing unit (CPU), such as a microprocessor. Other telematics sub-systems can also be included in the telematics component 10 as desired. The telematics component 10 is installed (arrow A) in a vehicle 20 having a gateway 21 containing a Bluetooth transceiver 22. Power can be supplied to the component 10 either through a self-contained battery pack or a hard-wired connection to a power supply of the vehicle (e.g., the battery).

The GPS device 11 is self-contained and, with the CPU 14 and appropriate internal software, is able to output any desired GPS data (e.g., time or position in various units or formats). The data pump 12 is configured to receive and supply data to the Bluetooth transceiver 13 for processing by the gateway 21 or CPU 14. Such data will be addressed in further detail below. The Bluetooth transceiver 13 is configured as a standard Bluetooth interface so that the telematics component 10 is recognized and paired just like any other device after the appropriate acknowledgement routine is carried out. Alternatively, the telematics component 10 can be hardwired into the vehicle.

It is noted that each vehicle 20 can have its own kind of gateway 21. Thus, display, control, and all other functions capable of being carried out by the gateway 21 will most likely be device-specific. Accordingly, the telematics component 10 is configured with appropriate software 15 for interfacing with each of the different gateways 21 presented for connection. In one embodiment, the telematics component 10 can be configured to operate with a single, specific gateway 21. Thus, different telematics components 10a-n are created, one for each of the possible gateways 21. In such a case, the vehicle 20 in which the component 10a-n is to be installed is identified and the appropriate component 10a-n is used. Alternatively, the component 10 can be configured with all possible gateway interface operating configurations and, upon installation can be programmed to execute the appropriate configuration for that specific gateway 21. This execution can be manual (based upon user input of the corresponding vehicle identification) or can be automatic (through a sequence of question and answer transmissions to the gateway 21). Specifications of each gateway 21 may be provided by the vehicle manufacture so that the software 15 can be developed accordingly.

The customized software 15 enables a single GPS system 11, a single data system 12, and a single Bluetooth system 13 to be customized for interfacing with any functionality operable by or through the vehicle's gateway 21. Thus, even if the vehicle was not designed to provide GPS functionality, as long as the gateway 21 has a display (or is connected to a display) and as long as that display's specifications have been provided beforehand, the software 15 can format the call status/progress updates into a form suitable for projection by the existing display to the user.

As set forth above, standard gateways 21 have the ability to interface with cell phones 30 that are present in or near the vehicle 20. Communication can occur from the vehicle 20 through the cell phone 30 to a third party or from a third party to the cell phone 30 (e.g., SMS text) or through the cell phone 30 to the occupant in the vehicle 20 (e.g., voice call). The telematics component 10 is able to expand upon this ability to bi-directionally communicate outside the vehicle 20 by linking to the cell phone 30 through the gateway 21. Because the telematics component 10 has the ability to communicate any data it desires over the Bluetooth transmission channel 40 (i.e., the Bluetooth gateway), it can, for example, obtain the current paired client list of the Bluetooth 22 device in the gateway 21, and use one (or more) of the paired devices remotely through the secondary Bluetooth transmission channel 50. More specifically, if the telematics component 10 needed to send a message to a base station 60, then the data pump 12 would configure the appropriate data to be transmitted along with relevant control logic. Once the data pump 12 acknowledged that the communications channel 71 to the base station 60 was open (which state the telematics component 10 could detect), the control logic would then cause the appropriate data to be transmitted to the base station 60. The present disclosure, therefore, entirely eliminates the need for a bi-directional, voice-supporting cellular device to be included in the telematics component 10.

There are a number of exemplary uses for the telematics component 10 so configured. One exemplary use is the most commonly found use of a telematics device—to summon roadside assistance. For the present example, the entity supplying the telematics component 10 has live operators at a remote facility, e.g., at the base station 60, for providing roadside assistance through a voice communication. Further, the telematics component 10 has a user interface control (which is not illustrated in FIG. 1 but could include software on gateway 21) that calls the operator center upon a single actuation. For example, the telematics component 10 can have a red "emergency" button that, when pressed, opens a communications channel to the operator. Accordingly, when the vehicle occupant presses the button, the appropriate software 15 is called up to enable a "live-operator-communication." The software 15 communicates via Bluetooth 13 to Bluetooth 22 to receive the active paired phones list. The active paired phones list is then passed to the data pump 12. Whatever additional data is needed for this operation (e.g., the destination address for the data center at the base station 60) is used by the data pump 12. The data pump 12 then triggers the gateway 21, which requires a first paired device (i.e., the cell phone 30) to receive a phone call from the base station 60, thus, carrying out the desired "live-operator-communication" function.

If, as shown in FIG. 1, the telematics component 10 has an embedded GPS system 11, the data sent to the base station 60 can include current GPS location coordinates. In this way, the operator could be provided with the information pinpointing the vehicle's location before voice communication occurs between the operator and the occupant.

Beneficial to the inventive system and process is the ability to utilize any Bluetooth communication device within range of the vehicle 20. Whether or not the device has already been recognized (i.e., coupled with the gateway 21 in the past) or is new to the system (in which case, a recognition protocol between the system and the device may need to be carried out), if the Bluetooth system 22 has the device's identification information in its client stack, then the telematics component 10 has the possibility of directing calls to and through each such device as desired. In normal use, however, the telematics component 10 merely retrieves the identity of all currently paired devices from Bluetooth 22. If desired, the component 10 can periodically communicate this information to the base station 60, which keeps a vehicle-specific paired-device list.

Roadside assistance is only one of the possible telematics functions that could be provided with the inventive telematics component 10 of the present disclosure. Another function that could be provided with the component 10 is a door-unlock command. If the gateway 21 is communicatively coupled with the device that unlocks a locked door of the vehicle, then the telematics component 10 can interface with the door-unlocking device. As set forth above, the manufacturer provides the specifications for causing the gateway 21 to actuate the door-unlocking device. The telematics controller 10 stores this data internally. After appropriate authentication, the operator can transmit the pre-programmed authorization command to the telematics controller 10 via the data pump 12. When the telematics controller 10 receives the authorization command, the appropriate control logic is sent to the gateway 21 to activate the door-opening device. If the gateway 21 is similarly connected to the vehicle starting assembly, then the telematics controller 10 can effect a remote engine start with little added difficulty. Likewise, if the gateway 21 has access to the vehicle's diagnostics bus, then any available diagnostic status can be made accessible not only to the driver, but also to an operator at the base station 60. In an emergency, where the driver/passenger(s) is not available, the telematics controller 10 can be programmed to automatically send a diagnostics state(s) to the base station 60.

Figure 2:
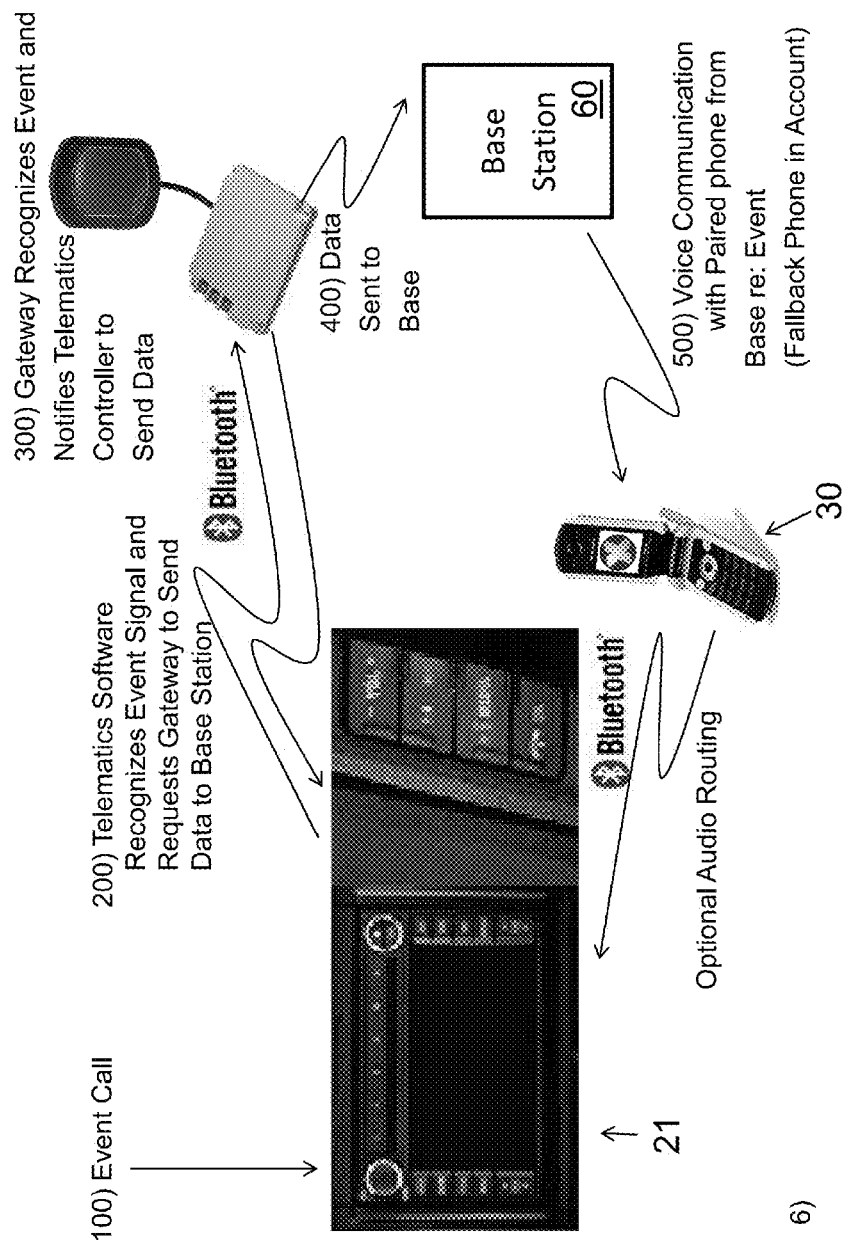
FIG. 2 is a diagrammatic illustration of a process for utilizing the telematics component according to an exemplary embodiment.

For example and with reference to FIG. 2, after an event occurs that requires the telematics software to take an action, referred to herein as an event call, the base station 60 can be provided automatically with both diagnostics data and GPS position data. Also sent to the base station 60 is the cell phone number for one or more currently paired cell phones 30 within the Bluetooth PAN of the vehicle 20. Upon receiving the event call, an operator can be directed to call any or all of the currently paired cell phones 30 associated with that vehicle 20.

Figure 3:
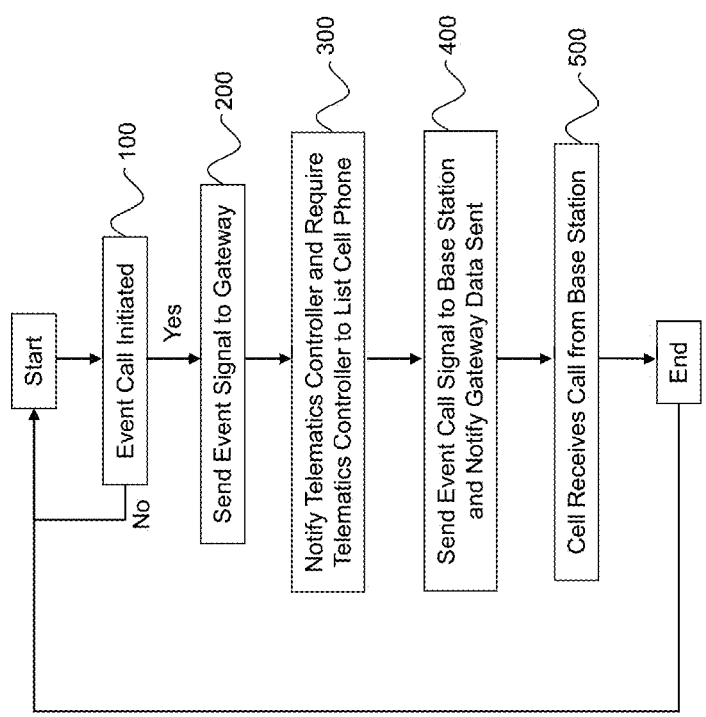
FIG. 3 is a flow chart of the process for utilizing the telematics component of FIG. 2.

More specifically, reference is made to the flow chart of FIG. 3 to describe this process. Beginning in Step 100, the system waits for an event call. When an event call occurs, an event signal is sent to the gateway 21 in Step 200. The telematics software on the gateway 21 recognizes receipt of the event call. In Step 300, the telematics software notifies the telematics controller 10 and sends the appropriate data to the telematics controller 10 to list at least one cell phone 30 in the Bluetooth stack of the gateway 21. In Step 400, the telematics controller 10 sends an event call signal to the base station 60 and notifies the gateway 21 that the data was sent. The cell phone 30 receives a call from the base station 60 connecting the cell phone audio to the base station 60 in Step 500. If desired, audio from the cell phone 30 can be routed to the vehicle's speakers to the occupant via Bluetooth 22. In this way, by having the base station 60 call the vehicle directly, the inventive system avoids an issue that has plagued the telematics industry since its early days—bad Caller-ID. Additionally, or alternatively, the base station 60 can have a fallback phone number for such an emergency and, simultaneously or thereafter, can require an operator to call that phone number.

Figure 4:
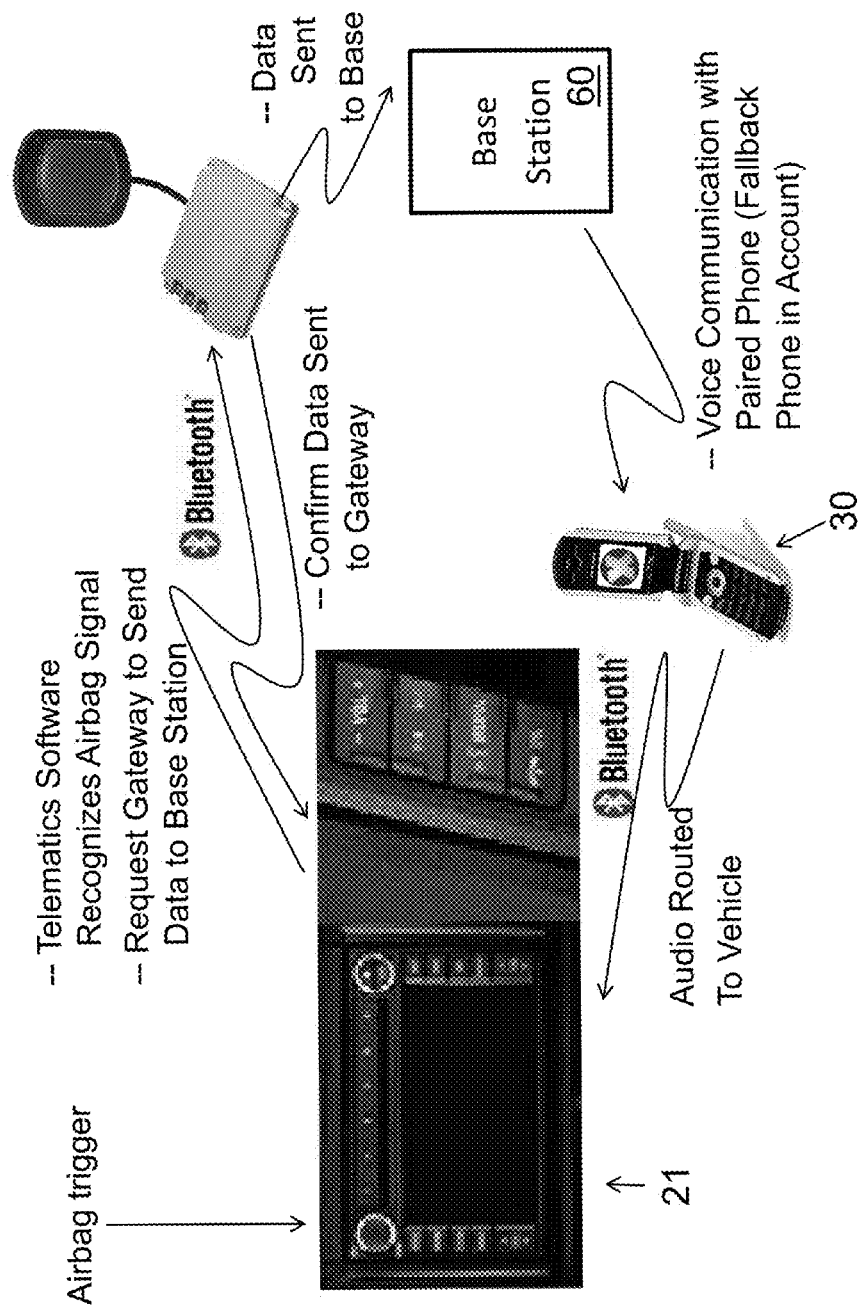
FIG. 4 is a diagrammatic illustration of a process for utilizing the telematics component according to an exemplary embodiment.

Deployment of an airbag and the resulting communication is described with reference to FIG. 4. After an air bag is deployed, the base station 60 needs to be provided with both diagnostics data and GPS position data. More specifically, an airbag trigger signal is sent to the gateway 21. The telematics software on the gateway 21 recognizes receipt by the gateway 21 of the airbag trigger. The telematics software notifies the telematics controller 10 and sends the appropriate data to the telematics controller 10 send notification to the base station and to list at least one cell phone 30 in the Bluetooth stack of the gateway 21. The telematics controller 10 sends an airbag deployment signal to the base station 60 and notifies the gateway 21 that the data was sent. Also sent to the base station 60 is the cell phone number for one or more currently paired cell phones 30 within the Bluetooth PAN of the vehicle 20. Upon receiving an accident indication, an operator can be directed to call any or all of the currently paired cell phones 30 associated with that vehicle 20. The cell phone 30 receives a call from the base station 60 informing the user of the cell phone of the airbag deployment. If desired, audio from the cell phone 30 can be routed to the vehicle's speakers to the occupant via Bluetooth 22.

There are instances where the driver/owner of the vehicle 20 should be notified about current conditions of the vehicle 20. For example, if the vehicle's alarm system activates and the driver is not within range of the vehicle 20, then the operator at the base station 60 can be silently informed of the alarm's activation and call a pre-programmed cell phone, such as the owner's phone, or can be asked to call the police with GPS position information of the vehicle 20.

Other telematics functions require information from the GPS module 11. If position, direction, and speed are made available to the software 15 and base station 60 from the telematics controller 10, then it is possible to carry out, for example, speed alerts, real-time remote vehicle location requests, geo-fencing, stolen vehicle recovery procedures, and updates for traffic, weather and/or parking. If the in-vehicle display controlled by the gateway 21 is sufficiently robust, then navigation, point-of-interest, and trip-planning features can be made available to the driver without installing a costly navigation system in the vehicle.

A device and method for simplifying manufacturer-fitted telematics systems and retrofitting a telematics communication and control unit in a vehicle configured with a Bluetooth transceiver has been disclosed that overcomes the disadvantages of the prior art.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems and methods. However, the systems and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems and methods as defined by the following claims.

What is claimed is:

1. A method for providing telematics to a vehicle, which comprises:
    providing a telematics unit with:
        a Global Positioning System (GPS) device;
        a data pump; and
        a short range wireless personal area network transceiver;
    communicatively connecting the telematics unit to an integrated communication device of the vehicle, the integrated communication device having a memory holding a list uniquely identifying at least one mobile communication device selected from a currently paired mobile communication device, a previously paired mobile communication device, and a pre-defined mobile communication device;
    transmitting an alert out from the telematics unit to an off-site telematics provider utilizing a communications path of the data pump; and
    receiving a channeled response to the alert from the off-site telematics provider automatically through the at least one mobile communication device.

2. The method according to claim 1, wherein the communications path of the data pump is a communications path from the data pump to the integrated communication device of the vehicle and from the integrated communication device of the vehicle through the at least one mobile communication device.

3. The method according to claim 1, wherein the communications path of the data pump is a communications path from the data pump, through the transceiver, and through the at least one mobile communication device.

4. The method according to claim 1, wherein the integrated communication device of the vehicle further comprises a short range wireless personal area network transceiver and wherein the communications path of the data pump is a communications path from the data pump through the transceiver of the telematics unit, through the transceiver of the vehicle, and through the at least one mobile communication device.

5. The method according to claim 1, wherein the transmitting step is carried out by transmitting the alert out from the telematics unit utilizing a direct communications path between the data pump and the off-site telematics provider excluding the integrated communication device.

6. The method according to claim 1, wherein the channeling step is carried out by channeling a response to the alert from the off-site telematics provider automatically through the at least one mobile communication device utilizing a direct communications path between the off-site telematics provider and the at least one mobile communication device excluding the telematics unit.

7. The method according to claim 1, wherein:
    the integrated communication device of the vehicle includes a short range wireless personal area network transceiver; and
    the communicative connecting step is carried out by communicatively connecting the transceiver of the telematics unit to the transceiver of the integrated communication device of the vehicle.

8. A method for providing telematics to a vehicle, which comprises:
    providing a telematics unit with:
        a Global Positioning System (GPS) device;
        a data pump; and
        a short range wireless personal area network transceiver;
    communicatively connecting the telematics unit to an integrated communication device of the vehicle, the integrated communication device having a memory holding a list uniquely identifying at least one mobile communication device selected from a currently paired mobile communication device, a previously paired mobile communication device, and a pre-defined mobile communication device;
    transmitting an alert out from the telematics unit to an off-site telematics provider utilizing a communications path of the integrated communication device; and
    receiving a channeled response to the alert from the off-site telematics provider automatically through the at least one mobile communication device.

9. The method according to claim 8, wherein the transmitting step is carried out by transmitting the alert out from the telematics unit utilizing a communications path of the integrated communication device through the at least one mobile communication device.

10. The method according to claim 8, wherein the transmitting step is carried out by transmitting the alert out from the telematics unit utilizing a communications path between the integrated communication device and the data pump.

11. The method according to claim 8, wherein:
    the integrated communication device of the vehicle includes a short range wireless personal area network transceiver; and
    the communicative connecting step is carried out by communicatively connecting the transceiver of the telematics unit to the transceiver of the integrated communication device of the vehicle.

12. The method according to claim 8, wherein the communications path of the integrated communication device is a communications path from the data pump to the integrated communication device of the vehicle and from the integrated communication device of the vehicle through the at least one mobile communication device.

13. The method according to claim 8, wherein the integrated communication device of the vehicle further comprises a short range wireless personal area network transceiver and wherein the communications path of the integrated communication device is a communications path from the data pump of the telematics unit, through the transceiver of the telematics unit, through the transceiver of the integrated communication device, and through the at least one mobile communication device.

14. A method for providing telematics to a vehicle, which comprises:
   providing a telematics unit with:
      a Global Positioning System (GPS) device;
      a data pump; and
      a short range wireless personal area network transceiver;
   communicatively connecting the telematics unit to an integrated communication device of the vehicle, the integrated communication device having a memory holding a list uniquely identifying at least one mobile communication device selected from a currently paired mobile communication device, a previously paired mobile communication device, and a pre-defined mobile communication device;
   transmitting an alert out from the telematics unit to an off-site telematics provider utilizing a communications path between the transceiver, the integrated communication device, and the at least one mobile communication device; and
   receiving a channeled response to the alert from the off-site telematics provider automatically through the at least one mobile communication device.

15. The method according to claim 14, wherein:
   the integrated communication device of the vehicle includes a short range wireless personal area network transceiver; and
   the communicative connecting step is carried out by communicatively connecting the transceiver of the telematics unit to the transceiver of the integrated communication device of the vehicle.

16. The method according to claim 1, wherein the short range wireless personal area network transceiver is a Bluetooth transceiver.

17. The method according to claim 8, wherein the short range wireless personal area network transceiver is a Bluetooth transceiver.

18. The method according to claim 14, wherein the short range wireless personal area network transceiver is a Bluetooth transceiver.

* * * * *